UNITED STATES PATENT OFFICE.

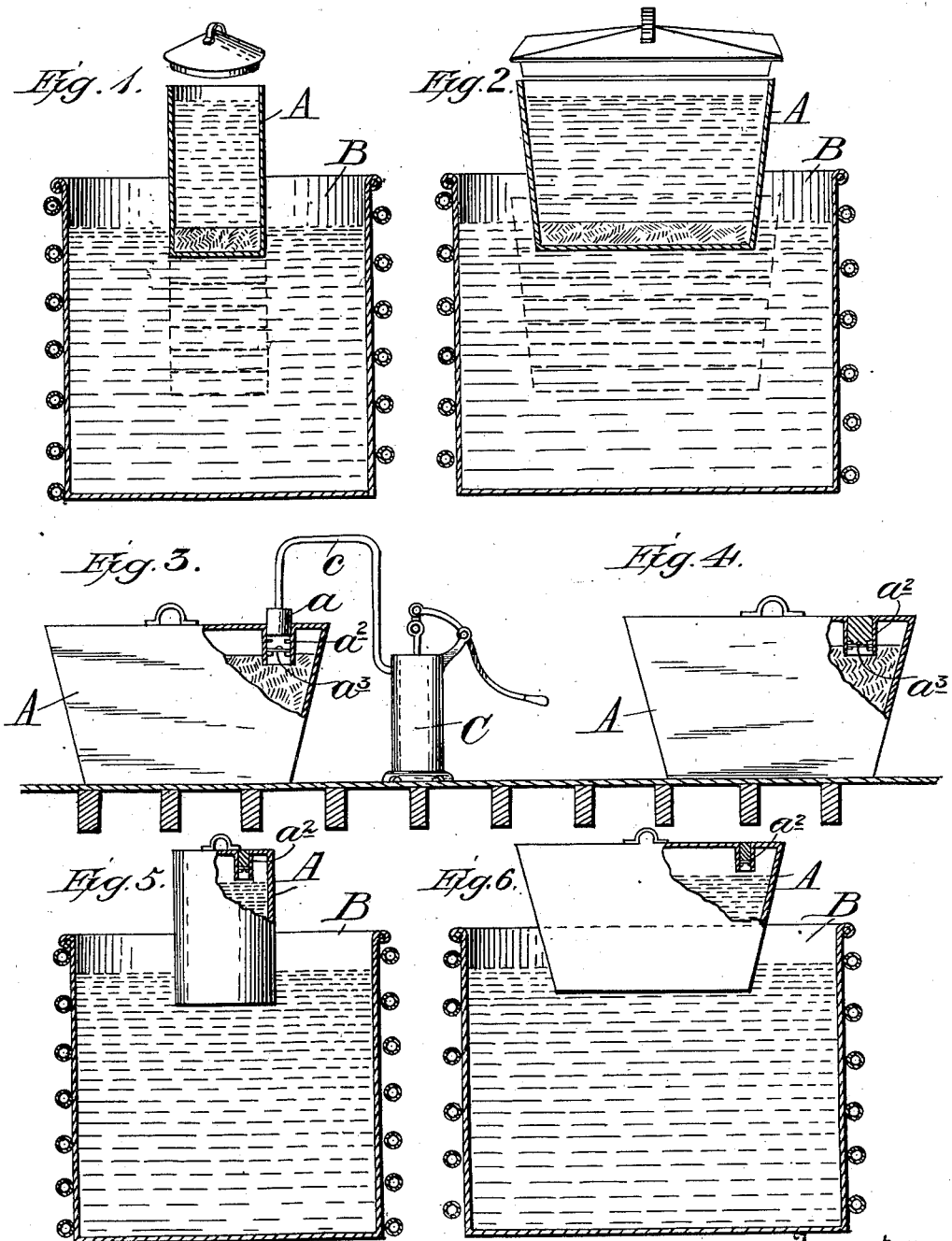

JOSEPH MISKOLCZY, OF NEW YORK, N. Y., ASSIGNOR TO THE MISKO ICE CO., OF SAME PLACE.

METHOD OF MAKING ARTIFICIAL ICE.

SPECIFICATION forming part of Letters Patent No. 671,398, dated April 2, 1901.

Original application filed June 15, 1899, Serial No. 720,721. Divided and this application filed July 31, 1899. Renewed April 6, 1900. Serial No. 11,895. (No model.)

*To all whom it may concern:*

Be it known that I, JOSEPH MISKOLCZY, a citizen of the United States, residing at New York, in the county of New York and State of New York, have invented certain new and useful Improvements in Methods of Making Artificial Ice; and I do declare the following to be a full, clear, and exact description of the invention, such as will enable others skilled in the art to which it appertains to make and use the same, reference being had to the accompanying drawings, and to the letters of reference marked thereon, which form a part of this specification.

The object is in a simple, economical, and rapid manner to produce ice at any desired low degree of temperature without danger of rupturing the pan, mold, or vessel in which the ice is formed.

The invention consists in the method of producing artificial ice, as will be hereinafter described and claimed.

In the accompanying drawings, forming a part of this specification, and in which like letters of reference indicate corresponding parts, I have illustrated two ways of carrying my invention into effect, it being understood that the particular procedures illustrated may be departed from without changing the scope of the invention, and in these drawings—

Figure 1 is a view in sectional elevation, exhibiting diagrammatically the manner of effecting congelation of a liquid contained in a cylindrical holder, which may be left uncovered, as shown, or be closed, as preferred, but not hermetically sealed. Fig. 2 is a similar view displaying the same procedure being carried into effect in connection with a tapered rectangular mold or holder. Fig. 3 is a view in elevation, partly in section, displaying a holder partly filled with liquid and an air-pump or exhauster by which a partial vacuum may be formed between the fluid and the top of the holder. Fig. 4 is a view similar to Fig. 3, showing the air-exhausting mechanism removed and the space occupied by the exhaust-tube thereof filled with solder or the like to effect the sealing of the holder hermetically; and Figs. 5 and 6 are views similar to Figs. 1 and 2, respectively, showing the procedure of freezing a hermetically-sealed holder.

Referring to the drawings, and particularly to Figs. 1 and 2 thereof, I have shown diagrammatically the method of procedure by which I effect freezing or congelation of water contained in an ordinary receptacle—that is, in a cylinder, as shown in Fig. 1, or a tapered rectangular mold or holder, as shown in Fig. 2— the same being provided with movable covers, which, as shown, may be removed from the receptacle during the process of freezing. The receptacles A are filled, or partly so, with liquid to be frozen or with ice, or with liquid and ice, and are placed in a brine-vat B, the contents of which is kept at the requisite low degree of temperature by any of the methods in vogue in effecting artificial congelation. As shown in the figures referred to, which display the first step of freezing, only a short length of the bottom portion of the receptacle is immersed in the brine, the receptacle being held in this position by any suitable mechanism, and when a stratum of perfectly-frozen ice has been formed the receptacle is moved down a short distance by mechanism not necessary to be shown and held there until another stratum is formed, and so on until the contents of the receptacle is frozen, the projection of the receptacle into the brine being effected progressively—that is to say, in a step-by-step manner, with the requisite interval between each step to afford time for perfect congelation of a stratum. By this step-by-step method of feeding the receptacle into the brine or other freezing agent and by freezing the liquid from below upward to the top of the receptacle the superposed body of water above the stratum of ice will be lifted as the successive strata are formed, thereby in an appreciable manner obviating all danger of fracture or of bursting the receptacle, and air and impurities will be projected upward, when, if desired, the impurities may be removed. By this procedure the ice can be subjected to the lowest obtainable temperature without danger of injuring the receptacle. It is be understood, however, that I do not limit my invention to the feeding of the receptacle in a step-by-step manner downward into a brine, as the same result—that is to say, freezing from below upward—may be effected by placing the receptacles containing the liquid to be frozen into a vat and then feeding predetermined quantities of a suitable freezing mixture by pulsations or otherwise into the vat, so that successive strata of ice will be formed within the receptacles from below upward.

When the contents of a receptacle is frozen, the receptacle may be removed from the freezing mixture and be used uncovered, or a cover may be employed, if preferred.

In the second form of embodiment of the invention, (exhibited in Figs. 3 and 4,) wherein an ordinary rectangular tapered shell or holder is shown, (although it is to be understood that it may be of any other shape,) I display the means by which a so-called "vacuum" may be effected within the holder above the contained liquid either before or after freezing and also the means by which the holder may be hermetically sealed after the requisite air has been exhausted, it being understood that the air may be exhausted from the holder at any point below atmospheric pressure down to as near a perfect vacuum as is obtainable. The holder may be provided either with a threaded depression or with an upward-projecting threaded nipple $a$ and with a downward-projecting tubular casing $a^2$, in which is arranged an ordinary gravity-valve $a^3$. In effecting the vacuum or the reduction of the air-pressure in the holder below that of atmospheric pressure I attach to the nipple $a$ a pipe $c$, connecting with an ordinary exhauster C. When the desired amount of air has been exhausted from the holder, the nipple $a$ is either cut off or is otherwise removed from the holder, and the space above the valve up flush with the top of the holder may be sealed by a slug of solder, as shown in Fig 4, or otherwise, whereby hermetically to seal the holder. The mode of procedure of freezing such holder when hermetically sealed is the same as that described in connection with the receptacles shown in Figs. 1 and 2 and as exhibited in Figs. 5 and 6. By the employment of a vacuum or a partial vacuum above the body of liquid to be frozen the process of congelation will be accelerated, as it is a well-known fact that absence of atmospheric pressure facilitates freezing.

Having thus fully described my invention, what I claim as new, and desire to secure by Letters Patent of the United States, is—

1. The method of freezing a liquid, held in a containing vessel, subjecting it to any desirable degree of temperature below the freezing-point, without causing rupture of the containing vessel, which consists in exposing the vessel containing the liquid, progressively—that is to say, in a step-by-step manner, to afford time for the air to escape, and with the requisite interval between each step to afford time for perfect congelation—to the desired low degree of temperature, thus excluding air and freezing the contained liquid progressively from below upward, substantially as described.

2. The method of freezing a liquid, held in a containing vessel, subjecting it to any desirable degree of temperature below the freezing-point, and without causing rupture of the containing vessel, which consists in exposing the vessel containing the liquid progressively—that is to say, in a step-by-step manner, to afford time for the air to escape, and with the requisite interval between each step to afford time for perfect congelation—to the desired low degree of temperature from above downward, thus excluding air and freezing the contained liquid progressively from below upward, substantially as described.

3. The method of freezing a liquid, producing a compact body, free from air, which consists in placing the liquid into a vessel and, with the vessel closed and hermetically sealed and the air exhausted therefrom, subjecting it, with the contained liquid, to an adequately low temperature, and leaving the vessel, then, exhausted, substantially as described.

4. The method of freezing a liquid, producing a compact body, free from air, which consists in placing the liquid into a vessel and, with the vessel permanently closed and hermetically sealed, and the air exhausted, exposing the vessel containing the liquid progressively—that is to say, in a step-by-step manner—to the desired low degree of temperature, from above downward, thus freezing the contained liquid progressively from below upward, substantially as described.

In testimony whereof I affix my signature in presence of two witnesses.

JOSEPH MISKOLCZY.

Witnesses:
R. G. DYRENFORTH,
R. M. ELLIOTT.